United States Patent [19]
Dovek et al.

[11] Patent Number: 5,625,506
[45] Date of Patent: Apr. 29, 1997

[54] METHOD AND APPARATUS FOR REDUCING READBACK ERRORS BY CONTROLLING THE PHASE LOCKED LOOP

[75] Inventors: Moris M. Dovek, San Carlos, Calif.; Gordon J. Smith, Rochester, Minn.; Jaquelin K. Spong, San Jose, Calif.

[73] Assignee: International Business Machines Corporation, Rochester, Mich.

[21] Appl. No.: 641,342

[22] Filed: May 1, 1996

Related U.S. Application Data

[63] Continuation of Ser. No. 261,437, Jun. 17, 1994, abandoned.

[51] Int. Cl.$^6$ ................................................ G11B 20/10
[52] U.S. Cl. .................................................. 360/51; 360/53
[58] Field of Search ........................... 360/51, 53, 46; 369/48, 54, 55

[56] References Cited

U.S. PATENT DOCUMENTS

| | | | |
|---|---|---|---|
| 4,003,086 | 1/1977 | Larsen et al. | 360/51 |
| 4,394,695 | 7/1983 | Mahor | 360/53 |
| 4,578,721 | 3/1986 | Brannan, Sr. | 360/51 |
| 4,719,523 | 1/1988 | Kutaragi | 360/51 |
| 4,726,022 | 2/1988 | Chan et al. | 360/53 |
| 4,908,722 | 3/1990 | Sonobe | 360/46 |
| 4,908,812 | 3/1990 | Aoshima et al. | 360/51 |
| 5,045,956 | 9/1991 | Ejima | 360/51 |
| 5,095,470 | 3/1992 | Oka et al. | 369/13 |
| 5,121,085 | 6/1992 | Brown | 360/51 |
| 5,146,372 | 9/1992 | Cronch et al. | 360/51 |
| 5,168,483 | 12/1992 | Oka et al. | 369/13 |
| 5,168,484 | 12/1992 | Wachi et al. | 369/13 |
| 5,329,251 | 7/1994 | Llewellyn | 360/51 |
| 5,404,250 | 4/1995 | Hase et al. | 360/51 |
| 5,424,883 | 6/1995 | Koren | 360/65 |

FOREIGN PATENT DOCUMENTS 0381208  8/1990  European Pat. Off. ............. 360/51

OTHER PUBLICATIONS

Maurine et al, "Dynamic Fly Height Monitor," IBM Technical Disclosure Bulletin, vol. 28, No. 11, Apr. 1986, pp. 5133-35.

Abstracts of Japan vol. 16 No. 457, Information Reproducing Device, Seiichiro Satomura, Pub. No. 04-162263, Pub. date: Sep. 22, 1992.

*Primary Examiner*—Aristotelis Psitos
*Assistant Examiner*—Larry T. Cullen
*Attorney, Agent, or Firm*—Joan Pennington

[57] ABSTRACT

A method and apparatus are provided for maintaining file readback performance compensating for readback errors caused by head/disk interaction used with a data detection channel in a direct access storage device. A readback signal is sensed from at least one disk surface and a data channel error rate is detected responsive to the readback signal. The detected data channel error rate is compared with a first predetermined threshold value and a gain of a phase lock loop (PLL) in the peak data detection channel is optimized responsive to an identified data channel error rate with a first predetermined threshold value. The PLL gain is adjusted until a lowest error rate is detected. A failure warning for the direct access storage device is provided to a user when the detected PLL gain is greater than a predefined loop gain value.

11 Claims, 4 Drawing Sheets

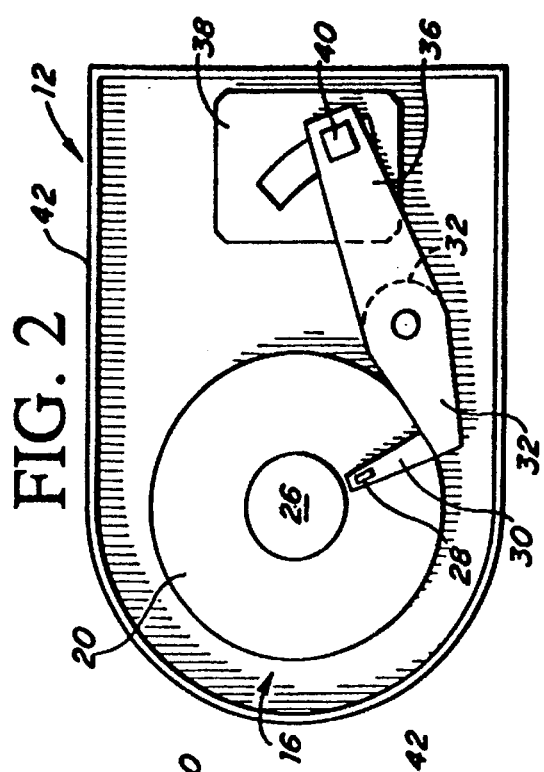
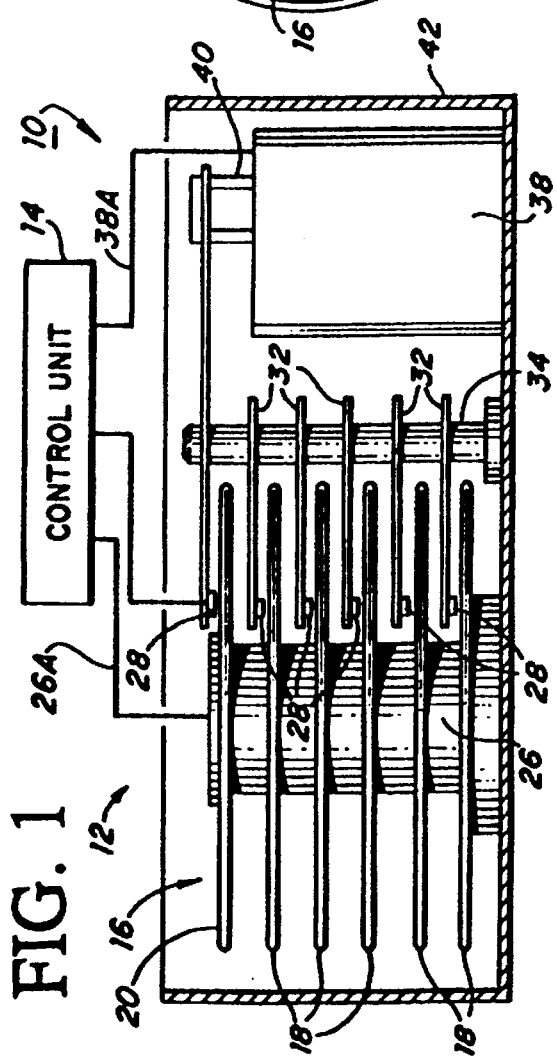

METHOD AND APPARATUS FOR REDUCING READBACK ERRORS BY CONTROLLING THE PHASE LOCKED LOOP

This application is a continuation of application Ser. No. 08/261,437 filed Jun. 17, 1994, now abandoned.

BACKGROUND OF THE INVENTION

1. Field of the Invention

The present invention relates generally to a method and apparatus for detecting transducer head and disk contacts in a direct access storage device (DASD) and more particularly to a method and apparatus for maintaining file readback performance compensating for readback errors caused by head/disk interaction used with a data detection channel in a DASD having instabilities.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Because the strength of the field arising from magnetic domains is exponentially dependent on the distance from the magnetic dipoles and their spatial frequency, magnetic recording systems have been moving toward ever smaller separations between the disks and the read/write transducer heads to achieve high linear densities.

Effective procedures for predictive failure analysis (PFA) are particularly needed for low-flying, small form-factor drives that see a range of operating conditions in the portable computing environment. In portable computing applications, the heads carried by low-flying sliders can come into contact with the disks in low-pressure situations, such as high altitudes or reduced cabin pressure in airliners. Reduced window margins and consequent bit shift errors indicate that the file will suffer, at best, a readback performance degradation and, at worst, a tribology problem at reduced pressures. In either case, the user should be warned of an impending problem.

As used in the following description and claims, the term gain of a phase lock loop (PLL) means gain or bandwidth of the PLL.

SUMMARY OF THE INVENTION

A principal object of the present invention is to warn the user (or the manufacturer prior to shipment) that a disk file is being operated under conditions that may result in tribological damage and unrecoverable data loss. Another important object of the present invention is to provide an improved method and apparatus for maintaining file readback performance compensating for readback errors caused by head/disk interaction used with a peak data detection channel in a direct access storage device. Other objects are to provide such method and apparatus for maintaining file readback performance in a disk drive substantially without negative effects and that overcome many of the disadvantages of prior art arrangements.

In brief, the objects and advantages of the present invention are achieved by a method and apparatus for maintaining file readback performance compensating for readback errors caused by head/disk interaction used with a data detection channel in a direct access storage device. A readback signal is sensed from at least one disk surface and a data channel error rate is detected responsive to the readback signal. The detected data channel error rate is compared with a first predetermined threshold value and a gain of a phase lock loop (PLL) in the peak data detection channel is optimized responsive to an identified data channel error rate with a first predetermined threshold value. The PLL gain is adjusted until a lowest error rate is detected. A failure warning for the direct access storage device is provided to a user when the detected PLL gain is greater than a predefined loop gain value.

BRIEF DESCRIPTION OF THE DRAWINGS

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

DETAILED DESCRIPTION OF THE PREFERRED EMBODIMENT

Figure 3:
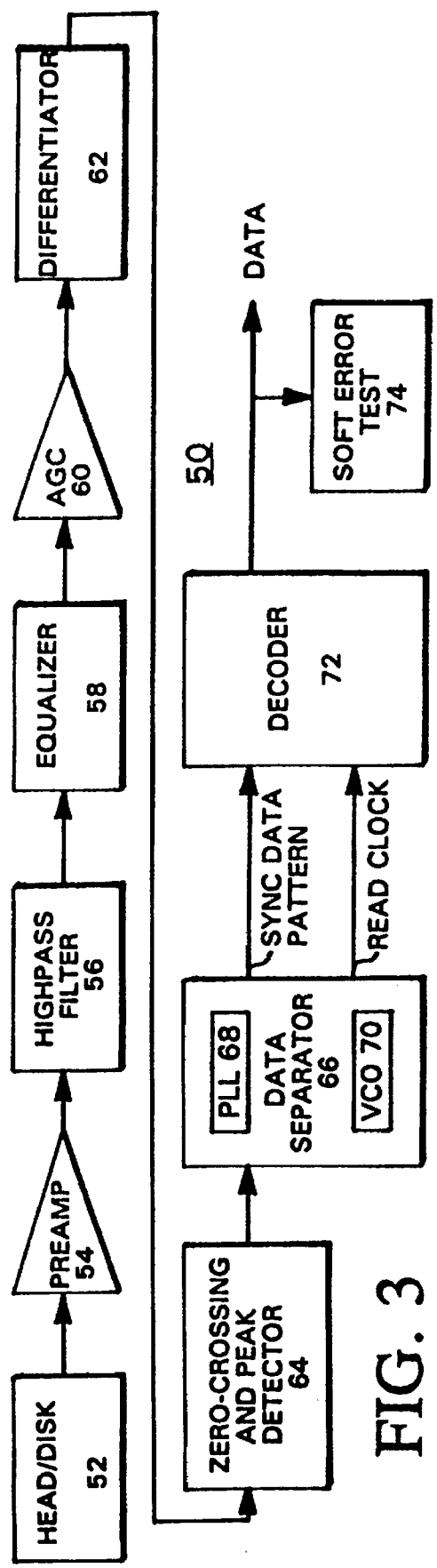
FIG. 3 is block diagram representation illustrating apparatus for carrying out the method of the present invention in the data storage disk file of FIG. 1.

In FIG. 1 there is shown a partly schematic block diagram of parts of a data storage disk file 10 including a data storage medium generally designated as 12 and a control unit or microprocessor generally designated as 14. In the preferred embodiment of this invention, the data storage medium 12 is embodied in a rigid magnetic disk drive unit 12, although other mechanically moving memory configurations may be used. Disk file 10 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor (VCM) 40 cooperating with a magnet and core assembly (not seen) operatively controlled for moving the transducer heads 28 in synchronism in a radial direction in order to position the heads in registration with data information tracks. Data storage disk file 10 is a modular unit including a housing 42. The various components of the disk file 10 are controlled in operation by signals generated by control unit 14 such as motor control signals on line 26A and position control signals on line 38A.

Referring to FIG. 3, there is shown a circuit diagram illustrating a peak detection read/write channel for carrying out the file performance compensation method of the invention generally designated by the reference numeral 50. The method of the invention is used in the peak data detection channel 50 at the file level, in situ, for detecting head/disk contacts. Warning is provided to the user that contact is occurring so that appropriate action can be taken before damage occurs. In FIG. 3, an analog read signal is obtained from a head/disk block 52. The readback signal obtained from the head/disk block 52 is applied to a preamplifier block 54 and amplified. The amplified read signal is filtered by a highpass filter 56 to sharpen the peaks of the readback signal and remove any low-frequency content. The filtered readback signal is applied to an equalizer 58 that is preset to boost the high-frequency content. The filtered and equalized readback signal is applied to an automatic gain control (AGC) 60. Then the readback signal output of AGC 60 is applied to a differentiator 62 providing the derivative of the readback signal with respect to time at its output. The differentiated readback signal is applied to a zero-crossing and peak detector 64 that detects the positive and negative peaks in the readback signal. The output of the zero-crossing and peak detector 64 is supplied to a data separator 66. The data separator, including a phase lock loop (PLL) 68 and a voltage controlled oscillator (VCO) 70, provides a synchronous data pattern and a read clock signal to a decoder 72. Decoder 72 provides the decoded data to a soft error test block 74 used for measuring the data channel error rate.

The method of the invention compensates for jitter by changing the gain of the PLL 68. This is particularly advantageous for data recovery in an environment where the head-to-disk spacing is likely to be reduced, for example, in an airplane. Jitter, caused by head-to-disk contact, is quantified using the PLL 68 included in the recording channel 50 of the file 10 and measured error rates at block 74.

Figure 4:
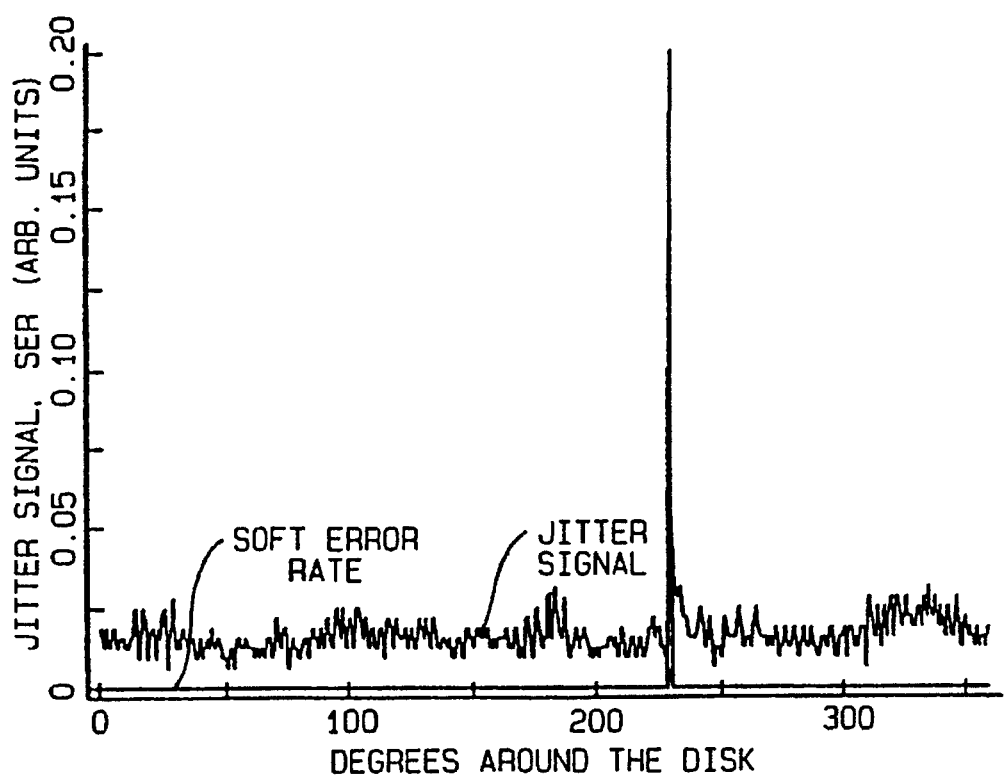
FIG. 4 is a chart illustrating a circumferential map of the jitter signal from the PLL and soft errors for a low-flying head and a supersmooth disk at nominal operating velocities.

FIG. 4 is a circumferential map of the jitter signal from the PLL for a low-flying head and a supersmooth disk. At nominal operating velocities, for example, greater than 4 m/sec, the transducer head/slider is approximately 10 nm off the disk, and no contacts are seen. However, when the velocity is reduced to 3 m/sec, the slider does interact with the disk at a position 235 degrees from the index, as can be seen from the jitter signal shown in FIG. 4. The occurrence of soft errors is provided together with the jitter data in FIG. 4, showing that the errors occur exclusively in the high-jitter region.

Figure 5:
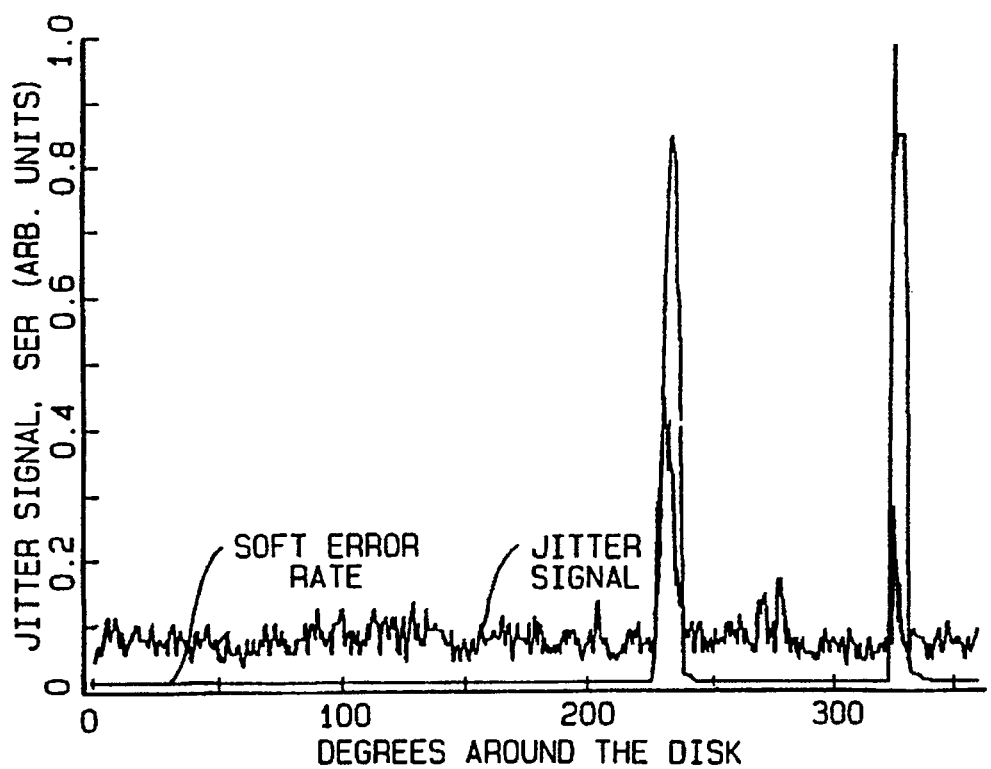
FIG. 5 is a similar chart as shown in FIG. 4 illustrating the effects of reduced operating velocities.

In FIG. 5 the velocity has been reduced further to 2.75 m/sec. The magnitude of the jitter signal in the area is increased, indicating increasing contact force, and another high-jitter area adjacent to the original one has appeared. Again the errors are exclusively occurring in these two regions. The jitter regions correspond to areas of high drag and low absolute clearance. In the situation where the errors are attributable to velocity jitter, the on-track error rate can be improved by increasing the bandwidth or gain of the channel phase-locked loop. Referring to the data of FIG. 5, if the bandwidth of the PLL is increased by a factor of 10, no on track errors are detected; and increasing the PLL bandwidth improves the soft error rate by at least three orders of magnitude, to less than exp(−8). The penalty for the increased bandwidth is greater noise admitted to the channel, particularly old information and off-track data. However, the overall error rate in this case is reduced because the overwhelming proportion of the errors are on-track, bit shift errors caused by the slider/disk contact.

Figure 6:
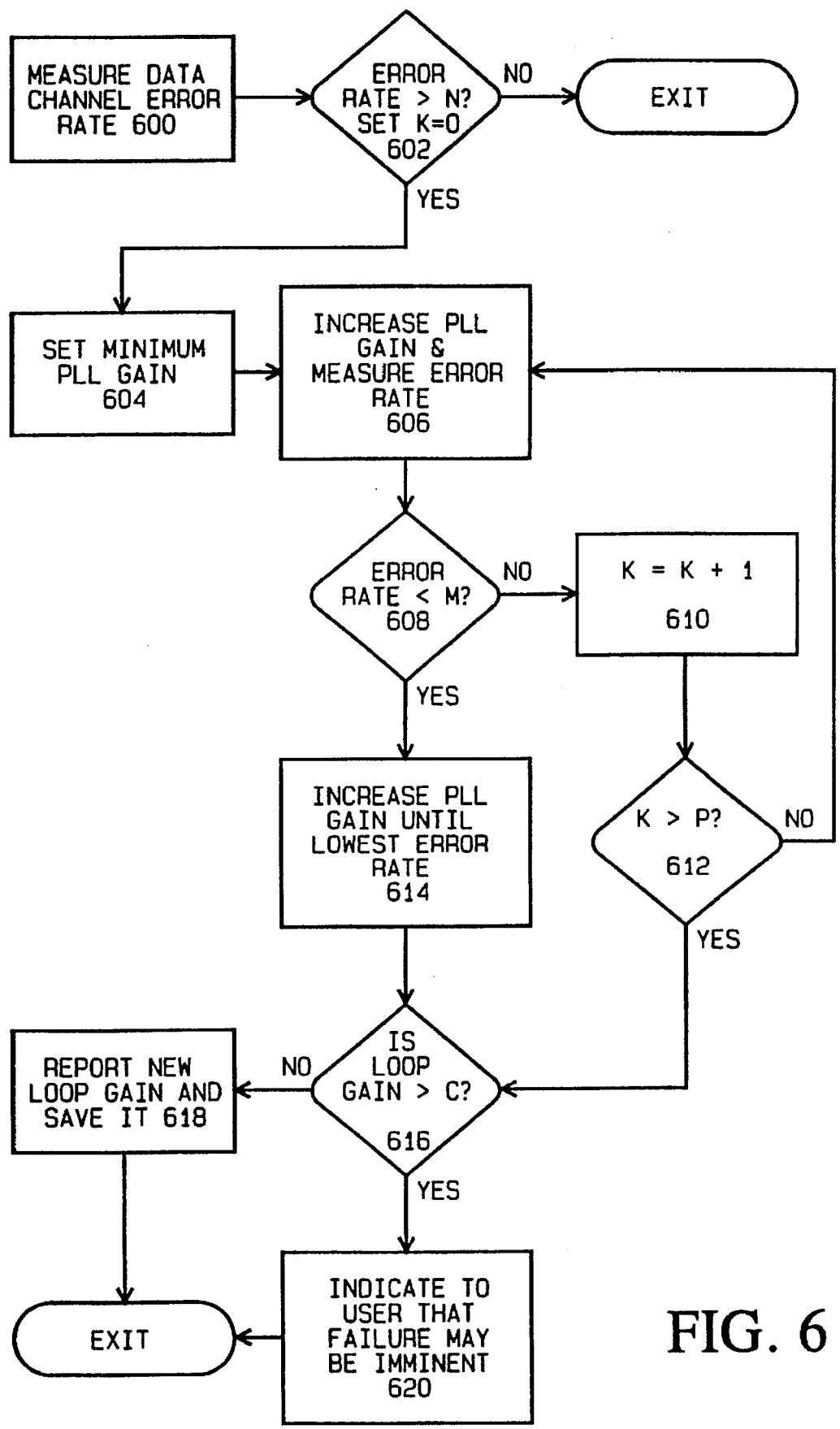
FIG. 6 is a flow chart illustrating sequential steps of the method of the invention for maintaining file readback performance compensating for readback errors caused by head/disk interaction.

Referring to FIG. 6, there is shown a flow chart illustrating the sequential steps for maintaining file readback performance compensating for readback errors caused by head/disk interaction. The method of the invention detects when the head and disk interactions are occurring and corrects file performance in the face of the readback errors. Also, a warning is provided to the user to take appropriate action to protect data if a threshold performance level is not achieved. Control unit 14 is suitably programmed to perform the method of the invention as illustrated and described with respect to FIG. 6. Since the invention can be implemented in control microcode in the file 10, no additional hardware is required, and the data channel error rate tests are performed in situ without user intervention.

In accordance with the invention, it has been determined that head/disk interaction can degrade file performance long before tribological damage occurs. The intermittent contact excites suspension vibrational modes and modulates the nominal slider/disk velocity. This velocity jitter diminishes the timing window margin for data detection, resulting in an increase in bit-shift errors. If the jitter is severe enough, the channel phase-locked loop (PLL) is unable to lock to the data stream, and the file no longer functions. Therefore, there are at least three failure modes associated with head/disk interactions including excessive error rate, PLL failure, and tribological failure.

As shown in FIG. 6, the method of the invention uses the relationship between the PLL loop parameters and the on-track error rate. Initially the data channel error rate is measured as indicated at a block 600. The error rate test is performed with a readback signal from selected tracks, for example near the inner tracks where the fly height may be the lowest, or can be performed in a low-pressure chamber. The measured data channel error rate is compared with a predetermined threshold value N, and an incremented loop iteration counter value K is set to zero as indicated at a decision block 602. If the error rate exceeds the threshold value N, for example exp(−8), then the microcode automatically sets the PLL gain to its minimum allowed value as indicated at a block 604. Then the PLL gain is incremented and the error rate remeasured as indicated at a block 606. The measured data channel error rate is compared with a second predetermined threshold value M as indicated at a decision block 608 to determine whether the error rate has improved. When the measured data channel error rate is greater than or equal to the value M, K is incremented by one as indicated at a block 610 and compared with a predetermined maximum number P of loop iterations at a decision block 612. If K is less than or equal to P, then the PLL gain is increased and the error rate remeasured at block 606.

These sequential steps are repeated the predetermined number P of times or until an error rate is identified at decision block 608 that is less than the predetermined threshold value M.

When an improved error rate less than the predetermined threshold value M is identified at decision block 608, then the gain of PLL 68 is adjusted further until the optimum value corresponding to the lowest error rate is found as indicated at a block 614. Then the loop gain is compared with a predefined value C as indicated at a decision block 616. If the sequential steps have been repeated so that K exceeds the maximum number P at decision block 612, then the PLL gain is compared with the predefined value C at the decision block 616. If the loop gain is less than the predefined value C, then the loop gain is reported so that the user is alerted that the change was made and the loop gain is saved as indicated at a block 618 to complete the PLL gain adjustment sequence. If the loop gain exceeds the predefined value C, the user is warned that failure may be imminent as indicated at a block 620 to complete the PLL gain adjustment sequence. Then open data files can be saved and the drive 10 can be backed up and taken in for repair or replaced.

The phase-locked loop gain and bandwidth values are available for microcode control using zoned recording in file 10. As various zones on the disk 18 are accessed, parameters in the peak detection channel 50, including gain and bandwidth of PLL 68, must be updated by the microprocessor 14. Therefore the optimization of the PLL gain in accordance with the invention is implemented without user intervention. While the preferred embodiment of the invention is shown in FIG. 6, it should be understood that other similar methods using PLL parameters can be employed to detect the onset of tribological failure. For instance instead of comparing the loop gain to the value C as in block 616, the range of acceptable PLL gains or bandwidths where the error rate is less than M can also be used. Then the user could be notified when the range falls below a set value R.

The invention is also suitable for a low-cost manufacturing test that is easily combined with existing tests available in the peak detection channel 50, thus requiring no additional capital or tester space. As described above, the amount of timing window is measured, as before, by identifying the error rate as a function of the PLL parameters. By this technique, low-flying heads can be identified prior to product shipment.

While the invention has been described with reference to details of the illustrated embodiment, these details are not intended to limit the scope of the invention as defined in the appended claims.

What is claimed and desired to be secured by Letters Patent of the United States is:

1. A method for maintaining file readback performance compensating for readback errors caused by head/disk interaction used with a data detection channel in a direct access storage device comprising the steps of:

sensing a readback signal from at least one disk surface;

measuring a data channel soft error rate responsive to said readback signal;

comparing said measured data channel soft error rate with a first predetermined threshold value; and adjusting a gain of a phase lock loop (PLL) included in a data separator in the data detection channel responsive to an identified data channel soft error rate greater than said first predetermined threshold value, said PLL gain adjusting step including the steps of setting a first gain of said PLL, increasing said gain of said PLL and measuring said data channel soft error rate; and responsive to said increased gain and said measured data channel soft error rate, optimizing said gain of said PLL; wherein the steps of increasing said gain of said PLL and measuring said data channel soft error rate; and responsive to said increased gain and said measured data channel soft error rate, optimizing said gain of said PLL include the step of:

comparing said measured data channel soft error rate with a second predetermined threshold value, said second predetermined threshold value being less than said first predetermined threshold value.

2. A method as recited in claim 1 wherein said steps of increasing said gain of said PLL and measuring said data channel soft error rate; and comparing said measured data channel error rate with said second predetermined threshold value are sequentially repeated until either a measured data channel error rate less than said second predetermined threshold value is identified or said steps are sequentially repeated a predetermined maximum number of times.

3. A method as recited in claim 2 further includes the step of:

responsive to identifying said measured data channel error rate less than said second predetermined threshold value, adjusting said PLL gain until a lowest error rate is detected.

4. A method as recited in claim 3 further includes the steps of:

comparing said adjusted PLL gain for said detected lowest error rate with a predefined loop gain value; and providing a failure warning for the direct access storage device to a user responsive to an identified lowest error rate PLL gain greater than or equal to said predefined loop gain value.

5. A method as recited in claim 2 further includes the step of:

responsive to sequentially repeating said steps said predetermined maximum number of times, comparing said PLL gain with a predefined loop gain value; and providing a failure warning for the direct access storage device to a user responsive to an identified PLL gain greater than or equal to said predefined loop gain value.

6. A method as recited in claim 3 further includes the step of:

comparing said lowest error rate PLL gain with a predefined loop gain value; and providing a report of changed loop gain to a user responsive to an identified lowest error rate PLL gain less than said predefined loop gain value.

7. Apparatus for maintaining file readback performance compensating for readback errors caused by head/disk interaction used with a data detection channel in a direct access storage device comprising:

means for sensing a readback signal from at least one disk surface;

means for measuring a data detection channel soft error rate responsive to said readback signal;

file optimization means for comparing said measured data channel error rate with a first predetermined threshold value;

means for adjusting a gain of a phase lock loop (PLL) included in a data separator in the data detection channel responsive to an identified data channel error rate greater than or equal to said first predetermined threshold value; said PLL gain adjusting means including means for setting a first gain of said PLL, means for increasing said gain of said PLL and for measuring said data channel soft error rate; means responsive to said PLL gain increasing means for comparing said measured data channel soft error rate with a second predetermined threshold value, said second predetermined threshold value being less than said first predetermined threshold value; and means, responsive to said gain increasing and said data channel soft error rate measuring means, for optimizing said gain of said PLL.

8. Apparatus as recited in claim 7 wherein said means for sensing a readback signal from at least one disk surface include means for sensing a readback signal at selected tracks of said disk surface, said selected tracks including inner tracks of said disk surface where the head fly height is lowest.

9. Apparatus as recited in claim 7 further includes:

means for comparing said optimized PLL gain with a predefined loop gain value; and means for providing a failure warning for the direct access storage device to a user responsive to an identified optimized PLL gain greater than or equal to said predefined loop gain value.

10. A disk file of the type including a data detection channel comprising:

an enclosure;

at least one disk surface for storing data mounted for rotation about an axis within said enclosure;

transducer means mounted for movement in a radial direction across said disk surfaces for reading and writing data to said disk surfaces;

means for sensing a readback signal from a disk surface;

a data channel including means for restoring the readback signal to the data; said data channel including a zero crossing and peak detector receiving said readback signal and coupled to a data separator, said data separator providing a synchronous data pattern output and a read clock signal output to a decoder providing decoded data, said data separator including a phase lock loop (PLL);

means coupled to said decoder for measuring a data channel soft error rate;

means for comparing said measured soft error rate with a first predetermined threshold value; and means for adjusting a gain of said PLL responsive to an identified soft error rate greater than said first predetermined threshold value by said means for comparing; said means for adjusting said gain of said PLL including means for setting a first gain of said PLL; means for increasing said gain of said PLL and for measuring said data channel soft error rate; means responsive to said PLL gain increasing means for comparing said measured data channel soft error rate with a second predetermined threshold value, said second predetermined threshold value being less than said first predetermined threshold value; and means responsive to said gain increasing and data channel soft error rate measuring means for optimizing said gain of said PLL.

11. A disk file as recited in claim 10 further includes:

means for providing a failure warning for the disk file to a user responsive to an identified optimized PLL gain greater than or equal to a predefined loop gain value.

* * * * *